US011893807B2

(12) United States Patent
Petrov et al.

(10) Patent No.: US 11,893,807 B2
(45) Date of Patent: Feb. 6, 2024

(54) METHOD FOR DETERMINING A LEVEL OF ALERTNESS OF A DRIVER

(71) Applicants: Continental Automotive France, Toulouse (FR); Continental Automotive GmbH, Hannover (DE)

(72) Inventors: Martin Petrov, Toulouse (FR); Alain Giralt, Toulouse (FR)

(73) Assignees: Continental Automotive France; Continental Automotive GmbH

(*) Notice: Subject to any disclaimer, the term of this patent is extended or adjusted under 35 U.S.C. 154(b) by 261 days.

(21) Appl. No.: 17/297,750

(22) PCT Filed: Dec. 13, 2019

(86) PCT No.: PCT/EP2019/085109
§ 371 (c)(1),
(2) Date: May 27, 2021

(87) PCT Pub. No.: WO2020/120751
PCT Pub. Date: Jun. 18, 2020

(65) Prior Publication Data
US 2022/0044037 A1     Feb. 10, 2022

(30) Foreign Application Priority Data
Dec. 13, 2018   (FR) ..................................... 1872827

(51) Int. Cl.
*G06V 20/59*    (2022.01)
*G06T 7/20*     (2017.01)
*G08B 21/06*    (2006.01)

(52) U.S. Cl.
CPC .............. *G06V 20/597* (2022.01); *G06T 7/20* (2013.01); *G08B 21/06* (2013.01);
(Continued)

(58) Field of Classification Search
CPC .................... G06V 20/597; G06T 7/20; G06T 2207/10016; G06T 2207/30196; G06T 2207/30268; G08B 21/06
See application file for complete search history.

(56) References Cited

U.S. PATENT DOCUMENTS 6,304,187 B1    10/2001  Pirim
9,475,502 B2*   10/2016  Fung ...................... B62D 6/001
(Continued)

FOREIGN PATENT DOCUMENTS

CN           1291320 A       4/2001
CN         103112352 A       5/2013
(Continued)

OTHER PUBLICATIONS

Qin et al, ("Detecting Driver Drowsiness and Distraction via FFT", Sep. 14, 2011, IEEE) (Year: 2011).*
(Continued)

*Primary Examiner* — Amara Abdi
(74) *Attorney, Agent, or Firm* — RatnerPrestia

(57) ABSTRACT

A method for determining a state of vigilance of a driver in a vehicle using a predetermined image-analyzing algorithm. The method especially includes a step of executing the predetermined algorithm on the generated sequence of images in order to detect a series comprising at least one movement of the head of the driver, a step of determining the speed and/or the amplitude of each identified movement and of the dynamic and static periods of the head of the driver, a step of detecting dynamic and static periods of the head of the driver and of measuring the frequency and duration of each period, and a step of determining a state of vigilance of the driver from the speed and/or the amplitude determined for each identified movement and from the frequency and duration of each detected period.

9 Claims, 3 Drawing Sheets

(52) U.S. Cl.
CPC ............ *G06T 2207/10016* (2013.01); *G06T 2207/30196* (2013.01); *G06T 2207/30268* (2013.01)

(56) References Cited

U.S. PATENT DOCUMENTS

| | | |
|---|---|---|
| 2010/0033333 A1 | 2/2010 | Victor et al. |
| 2012/0242819 A1 | 9/2012 | Schamp |
| 2015/0061875 A1 | 3/2015 | Yang et al. |
| 2015/0346813 A1* | 12/2015 | Vargas .................. G06F 3/017 345/8 |
| 2016/0272217 A1 | 9/2016 | Kim et al. |
| 2018/0239975 A1* | 8/2018 | Tamrakar ............ G06V 40/171 |
| 2018/0249274 A1* | 8/2018 | Lyren ...................... H04S 7/303 |
| 2019/0005341 A1 | 1/2019 | Korthauer et al. |

FOREIGN PATENT DOCUMENTS

| | | |
|---|---|---|
| CN | 105764735 A | 7/2016 |
| DE | 102016215291 A1 | 7/2017 |
| EP | 1695310 B1 | 8/2006 |
| GB | 2576155 A | 2/2020 |
| JP | 59140134 A | 8/1984 |
| JP | 2015090676 A | 5/2015 |
| JP | 2017219885 A | 12/2017 |

OTHER PUBLICATIONS

Qin, H., et al., "Detecting driver drowsiness and distraction via FFT," Sep. 14, 2011, 3 pages, XP032065712, Signal Processing, Communications and Computing (ICSPCC), 2011 IEEE International Conference on IEEE.

Mittal, A., et al., "Head movement-based driver drowsiness detection: A review of state-of-art techniques," Mar. 17, 2016, 6 pages, XP032962298, 2016 IEEE International Conference on Engineering and Technology (ICETECH), IEEE.

International Search Report and Written Opinion for International Application No. PCT/EP2019/085109, dated Feb. 24, 2020, with partial English translation, 11 pages.

International Search Report and Written Opinion for International Application No. PCT/EP2019/085109, dated Feb. 24, 2020, 16 pages (French).

Chinese Office Action for Chinese Application No. 201980082492.4, dated Mar. 18, 2022 with translation, 25 pages.

* cited by examiner

METHOD FOR DETERMINING A LEVEL OF ALERTNESS OF A DRIVER

CROSS REFERENCE TO RELATED APPLICATIONS

This application is the U.S. National Phase Application of PCT International Application No. PCT/EP2019/085109, filed Dec. 13, 2019, which claims priority to French Patent Application No. 1872827, filed Dec. 13, 2018, the contents of such applications being incorporated by reference herein.

FIELD OF THE INVENTION

The invention relates to the field of providing assistance with driving a motor vehicle manually or autonomously, and more particularly relates to a computer and method for determining a level of vigilance of a vehicle driver.

BACKGROUND OF THE INVENTION

Nowadays, it is known practice to equip certain motor vehicles with a device that allows the state of the driver of the vehicle to be monitored in order especially to provide warning if the driver appears distracted or if the driver is slipping into a drowsy state. This type of monitoring device comprises a camera and a computer, which processes the images generated by the camera in order to determine the level of vigilance of the driver. The computer may for example analyze the movement of the eyes, head or upper body of the driver, the size or shape of their face, the orientation and posture of their head or a combination of some or all of these parameters.

In one known solution, the computer analyzes the movement of the eyes of the driver: it may especially determine eyelid blink frequency, eyelid blink amplitude, eyelid blink duration, etc. It then compares these values to predetermined intervals of values characterizing levels of vigilance of the driver, in order to deduce therefrom whether said driver is awake and alert, awake but distracted, or drowsy, and to provide warning to this driver where appropriate.

Thus, in this existing solution, the monitoring device is based on direct measurements of the characteristics of the face of the driver, said measurements being carried out by the computer. However, this type of device has limits as regards its ability to measure the openness of the eyes and to detect the movements made by the pupils. Specifically, in certain cases, for example when the driver is wearing a pair of sunglasses or even a cap or when the ambient light level is high, the various portions of the face (the eyes, the mouth, the ears, etc.) are difficult for the computer to see and to differentiate between in the sequence of images generated by the camera. Thus, in certain cases, the movements made by each portion of the face, and especially by the eyes, are neither visible nor exploitable, and the monitoring device therefore proves to be ineffective.

Therefore, the device may not provide warning even though the driver is in a distracted or drowsy state, this running a risk as regards the safety of the driver.

SUMMARY OF THE INVENTION

There is therefore a need for a simple and effective solution that would allow these drawbacks to be at least partially remedied.

An aspect of the present invention aims to provide a simple, reliable and efficient solution that allows the level of vigilance of a vehicle driver to be determined.

To this end, one aspect of the invention is a method for determining a level of vigilance of a driver in a vehicle, especially a motor vehicle, using a predetermined image-analyzing algorithm, said vehicle comprising a camera and a computer, said computer implementing said predetermined algorithm using at least one so-called "input" parameter relating to the attitude of the driver, the method comprising the steps of:

generating, by means of the camera, a sequence of images of the head of the driver, executing the predetermined algorithm on said generated sequence of images in order to detect a series comprising at least one movement of the head of the driver, determining at least one value of at least one predetermined parameter relating to each movement of the detected series, comparing the at least one value of each parameter with a predetermined interval of values of said parameter, each predetermined interval of values of said parameter being associated with a different type of head movement, identifying each movement of the detected series using the at least one comparison made, determining the speed and/or amplitude of each identified movement, detecting dynamic and static periods of the head of the driver and measuring the frequency and the duration of each detected period, determining a level of vigilance of the driver using the speed and/or amplitude determined for each identified movement and the frequency and duration of each detected period.

The method according to an aspect of the invention allows the level of vigilance of the driver to be effectively determined using head movements, and especially the speed and/or amplitude thereof, and analysis, based on the movements of the head, of the frequency and duration of each period of activity and fixation, and thus warning to be provided to the driver in case of risk of signs of drowsiness or distraction. This especially allows a distracted or drowsy state of the driver to be detected when the latter has their face partially masked (glasses, cap, etc.) and/or when the ambient light level is high.

Preferably, the at least one parameter measured during the implementation of the method comprises an angle of rotation of the head of the driver with respect to the Earth's vertical or of inclination of the head of the driver with respect to the Earth's horizontal.

Preferably, the at least one parameter measured during the implementation of the method comprises the amplitude of the rotation or of the inclination of the head of the driver and/or the speed of the rotation or of the inclination of the head of the driver and/or the duration of each movement and/or the frequency of each movement.

The characteristics of the aforementioned parameters allow the method to accurately determine to which head movement each head movement of the series of movements corresponds.

Advantageously, the driver is detected to be in a drowsy state when the frequency of movement of the head of the driver with respect to the Earth's vertical or horizontal is lower than a predetermined dynamic threshold that, for example, is set to 1 by default for a predefined window, 30 seconds for example, then to 3 thereafter. This threshold is characteristic and reliable, being dynamically updated based on the characteristic parameters of each identified head movement. The characteristic parameters of each movement allow the activity and inactivity of the driver in a time window, for example shorter than 10 minutes, to be identified with a view to characterizing a drowsy state.

Advantageously, the driver is detected to be in a drowsy state when at least one inclination of the head of the driver downward with respect to the Earth's horizontal, preferably with an acceleration that is characteristic of a free movement of the head, for a duration shorter than 2 seconds, is detected. This threshold is another characteristic and reliable threshold allowing a drowsy state to be detected.

Preferably, the driver is detected to be in an alert state when at least one rotation of the head of the driver to the right or to the left with respect to the Earth's vertical in a predefined time window, the last 30 seconds for example, without a notable degradation of the movement characteristics in the time window, i.e. the characteristics are similar to those of movements detected when the driver is alert, is determined, for example when the frequency of rotation of the head of the driver remains higher than 1 rotation per minute. To detect an alert state, this combination of parameters is characteristic and reliable.

Preferably, the driver is detected by the method to be in a distracted state when at least one rotation of the head of the driver to the right or to the left with respect to the Earth's vertical or downward with respect to the Earth's horizontal for a duration longer than a predetermined duration, longer than 4 seconds for example, is determined. This type of threshold is reliable and characteristic of a distracted state of the driver.

An aspect of the invention also relates to a computer for a vehicle, in particular a motor vehicle, for determining a level of vigilance of a driver of said vehicle using a predetermined image-analyzing algorithm, said vehicle comprising a camera, said computer implementing said predetermined algorithm using at least one so-called "input" parameter relating to the attitude of the driver and being configured to:
- receive a sequence of images of the head of the driver, said sequence being generated by the camera,
- execute the predetermined algorithm on said received sequence of images in order to detect a series comprising at least one movement of the head of the driver,
- determine at least one value of at least one predetermined parameter relating to each movement of the detected series,
- compare the at least one value of each parameter with a predetermined interval of values of said parameter, each predetermined interval of values of said parameter being associated with a different type of head movement,
- identify each movement of the detected series using the at least one comparison made,
- determine the speed and/or amplitude of each identified movement,
- detect dynamic and static periods of the head of the driver and measure the frequency and duration of each detected period,
- determine a level of vigilance of the driver using the speed and/or amplitude determined for each identified movement and the frequency and duration of each detected period.

Advantageously, the at least one parameter measured by the computer comprises an angle of rotation of the head of the driver with respect to the Earth's vertical or of inclination of the head of the driver with respect to the Earth's horizontal.

Advantageously, the at least one parameter measured by the computer comprises the amplitude of the rotation or of the inclination of the head of the driver and/or the duration of each movement and/or the frequency of each movement.

Preferably, the computer detects the driver to be in a drowsy state when the frequency of rotation of the head of the driver with respect to the Earth's vertical is low and the characteristics of each movement are lower in speed and acceleration than the same movements made in the alert state.

Advantageously, the computer is configured to detect the driver to be in an alert state when at least one rotation of the head of the driver to the right or to the left with respect to the Earth's vertical or an inclination of the head with respect to the Earth's horizontal is determined.

Advantageously, the computer is configured to detect the driver to be in a distracted state when at least one rotation of the head of the driver to the right or to the left with respect to the Earth's vertical or an inclination of the head with respect to the Earth's horizontal for a duration longer than a predetermined duration, longer than 4 seconds for example, is determined.

Analogously, the computer allows the level of vigilance of the driver to be accurately and reliably determined.

An aspect of the invention also relates to a motor vehicle comprising a camera configured to generate a sequence of images of the head of the driver of said vehicle and a computer, such as presented above, connected to said camera in order to receive said sequence of images.

Adding vehicle-related data including the angle of the steering wheel, speed, acceleration, brake application and travel time improves the algorithm and makes the level of vigilance of the driver estimated thereby more accurate.

Such data allow the start of the journey to be adjusted for and the degradation of the level of vigilance of the driver over time to be tracked based on the characteristics of the detected head movements.

Preferably, the window in which the movements and their characteristics are recorded, with the period of activity and fixation, is at least 5 minutes. Because of the time taken to learn personalized thresholds and the dynamic variation of personalized thresholds for determining the level of vigilance of the driver, a minimum history of 5 minutes is required to obtain a robust diagnosis.

Advantageously, the analysis window may vary as a function of the number of movements detected at preceding times, for example during the last minute.

BRIEF DESCRIPTION OF THE DRAWINGS

Other features and advantages of aspects of the invention will become apparent from the following description, which is given with reference to the appended figures, which are given by way of non-limiting example and in which identical references have been used to designate similar objects.

DETAILED DESCRIPTION OF THE PREFERRED EMBODIMENTS

The computer according to an aspect of the invention is intended to be mounted in a vehicle, especially a motor vehicle, that is manually or autonomously driven, in order to detect a lack of vigilance (i.e. a lack of attention) on the part of the driver of said vehicle and to provide warning or activate automatic-driving mode if necessary.

Figure 1:
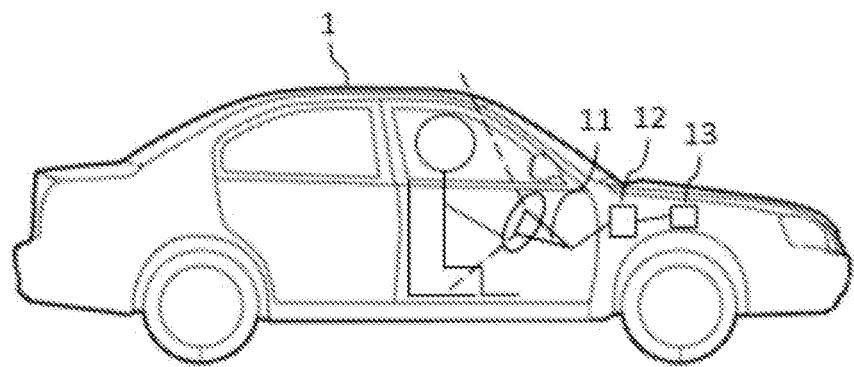
FIG. 1 schematically illustrates one embodiment of the vehicle according to an aspect of the invention.

FIG. 1 schematically shows one example of a vehicle 1 according to an aspect of the invention. The vehicle 1 comprises a camera 11, a computer 12 and an interface 13.

The camera 11 is, for example, placed behind the steering wheel or on the front windshield of the vehicle 1. The camera 11 may be placed in any position provided that the face of the driver 2 remains visible in the field of view of the camera 11.

The camera 11 is configured to generate periodically, for example at a frequency varying between 10 and 200 images per second, a sequence of images representing the head of the driver 2 and especially their face. The generated sequence of images is sent in real time to the computer 12.

The computer 12 is configured to receive and process in real time the sequence of images generated by the camera 11. More precisely, the computer 12 is configured to implement a predetermined image-processing algorithm on said received sequence of images in order to determine the level of vigilance of the driver 2.

The level of vigilance of the driver 2 is characteristic of the state of relative alertness of the driver 2, and especially of an alert state, of a distracted state or of a drowsy state.

The predetermined algorithm is stored in a memory area of the computer 12 and is implemented using a set comprising one or more parameters relating to the attitude of the driver 2. This set may comprise one or more parameters among: the amplitude of rotation or of inclination of the head of the driver 2, the speed of rotation or of inclination of the head of the driver 2, the duration of each movement of the head of the driver 2 and the frequency of each movement of the head of driver 2, the duration of each static period of the head of driver 2 and their frequency.

The vehicle 1 furthermore comprises an interface 13, for example on the dashboard of the vehicle 1, that especially allows a warning message to be displayed or played back to the driver when their level of drowsiness is higher than a predetermined warning threshold.

Figure 2:
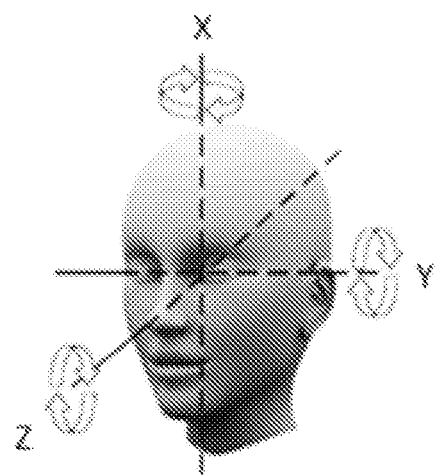
FIG. 2 schematically illustrates three axes allowing the movements of the head of a driver to be defined in three dimensions.

With reference to FIG. 2, by the term "rotation", what is meant is the rotation of the head of the driver 2 with respect to an axis X parallel to the Earth's vertical (yaw). By the term "inclination", what is meant is the inclination of the head of the driver 2 with respect to an axis Y parallel to the Earth's horizontal (pitch) or with respect to an axis Z parallel to the Earth's vertical (roll).

The predetermined algorithm allows, in the received sequence of images, a series comprising each movement of the head of the driver 2 to be detected, and then at least one value to be determined for each parameter of the set of parameter(s) relating to each movement detected in the image sequence.

The computer 12 is configured to compare the at least one value of each parameter with a predetermined interval of values of said parameter, each predetermined interval of values of said parameter being associated with a different type of head movement.

The computer 12 is configured to identify each movement of the detected series using the at least one comparison made.

The computer 12 is configured to determine the speed and/or amplitude of each identified movement of the series.

The computer 12 is configured to determine the level of vigilance of the driver 2 using the detected series and the speed and/or amplitude determined for each movement of the series.

The computer 12 is configured to detect dynamic periods (activity) and static periods (fixation) of the head of the driver 2 and to measure the frequency and duration of each dynamic or static period.

Figure 3:
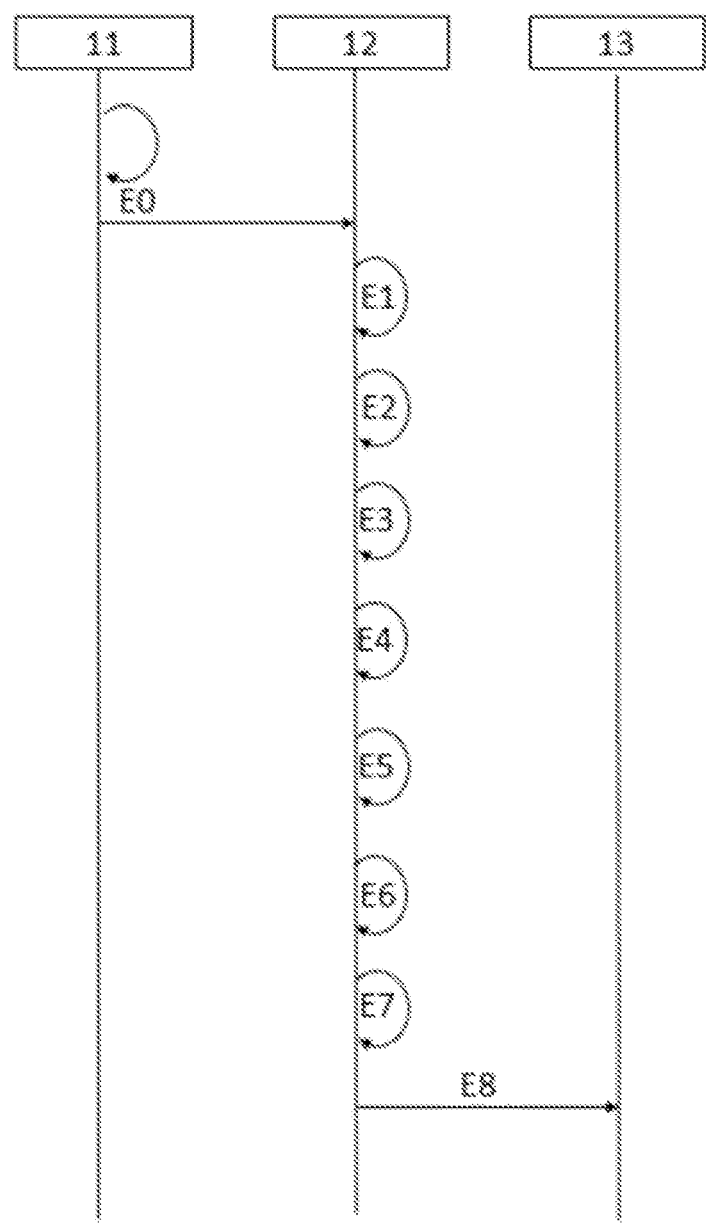
FIG. 3 shows one embodiment of the method according to an aspect of the invention.

The implementation of an aspect of the invention will now be described with reference to FIG. 3.

First of all, in a step E0, the camera 12 generates a sequence of images representing the head of the driver 2 and sends the generated sequence of images to the computer 12.

The computer 12 then executes, in a step E1, the predetermined algorithm on the received sequence of images in order to detect a series comprising at least one movement of the head of the driver 2. The algorithm detects a movement based on the change in the angle of the head compared to the Earth's horizontal and vertical. The analysis of each movement allows the characteristics of each parameter used to classify the movement to be computed. More precisely, the computer 12 will characterize each head movement of the driver 2 in the detected series in order to identify the type thereof.

Next, in a step E2, the computer 12 determines at least one value of at least one predetermined parameter relating to a head movement of the driver 2. In other words, the computer 12 determines the value of one or more parameters preferably among: the angle of rotation of the head of the driver 2 with respect to the Earth's vertical, the angle of inclination of the head of the driver 2 with respect to the Earth's horizontal, the amplitude of the rotation or inclination of the head of the driver 2, the speed of the rotation or inclination of the head of the driver 2, the duration of each movement and the frequency of each movement, the duration with respect to the preceding movement, the duration and acceleration of the rising and falling edge of the variation in the angles during the movement, the total duration of the movement, the direction of the head of the driver 2 during the movement.

Once the one or more parameter values have been determined, the computer 12 compares, in a step E3, the value determined for each parameter with a predetermined interval of values of said parameter. Each predetermined interval of values is characteristic of one type of head movement. For example, the rotation of the head of the driver 2 when this driver 2 looks at the right wing mirror of the vehicle 1 is characterized by a rotation angle comprised between 30 and 60 degrees. The same goes for any other head movement (rotation and/or inclination of the head toward the left wing mirror, toward the rear-view mirror, toward the right window, toward the left window, toward the dashboard, etc.). It will be noted that a given head movement may be characterized by one or more parameters.

After having made this or these comparisons, the computer 12 identifies, each in turn, in a step E4, each head movement made by the driver 2, i.e. determines the type of movement made. Preferably, the computer 12 updates in parallel the history of the series consisting of the types of movements identified in the sequence of images received from the camera 11, such a sequence of types of movement reflecting the level of vigilance of the driver 2.

The computer 12 determines, in a step E5, the speed and/or amplitude of each identified head movement then, in a step E6, detects dynamic and static periods of the head of the driver 2 and measures the frequency and duration of each detected period.

In a step E7, the computer 12 determines the level of vigilance of the driver 2 using the series of identified head movements, the speed and/or the amplitude determined for each identified movement and the frequency and duration of each detected dynamic or static period.

The various levels of vigilance are defined in the following way:
- the driver 2 is detected to be in a drowsy state when the frequency of rotation of the head of the driver 2 with respect to the Earth's vertical is very low, for example lower than 1 rotation per minute, and the speed and acceleration characteristics of the movements visible in the studied time window have degraded,
- the driver 2 is detected to be in a drowsy state when at least one downward inclination of the head of driver 2 (with respect to the Earth's horizontal) is detected with parameters (for example speed, acceleration, amplitude or duration of the movements) specific to the free movement of the muscles of the head when the driver 2 is asleep,
- the driver 2 is detected to be in an alert state when at least one rotation of the head of driver 2 to the right or to the left with respect to the Earth's vertical or downward with respect to the Earth's horizontal in the last 30 seconds is determined and/or when the frequency of rotation of the head of driver 2 remains higher than 1 rotation per minute without visible degradation of the characteristics of the movements in the time window,
- the driver 2 is detected to be in a distracted state when at least one rotation of the head of the driver 2 to the right or to the left with respect to the Earth's vertical or downward with respect to the Earth's horizontal for a duration longer than a predetermined duration, longer than 4 seconds for example, is determined.

Finally, the computer 12 provides warning to the driver 2, in a step E8, when the driver 2 is detected to be in a drowsy or distracted state. For example, the computer 12 sends a warning to the interface 13. This warning may take the form of an audio signal or of a light signal, for example an indicator light. This step allows the attitude of the driver 2 to be classified depending on whether the driver 2 is awake and paying attention to driving, is distracted or is drowsy. Each category may contain a plurality of levels.

In the case where the vehicle 1 is able to be driven automatically in an autonomous mode, the computer 12 could request a switch to autonomous-driving mode when the driver 2 is distracted or slipping into a drowsy state.

An aspect of the invention allows the level of vigilance of the driver 2 to be reliably and effectively determined. An aspect of the invention in particular adapts to each vehicle driver 2, in order to determine their level of vigilance and where appropriate to warn them in the event of a problem.

The invention claimed is:

1. A method for determining a level of vigilance of a driver in a vehicle using a predetermined image-analyzing algorithm, said vehicle comprising a camera and a computer, said computer implementing said predetermined algorithm using at least one so-called "input" parameter relating to the attitude of the driver, the method comprising:
   generating, by the camera, a sequence of images of the head of the driver,
   executing the predetermined algorithm on said generated sequence of images in order to detect a series comprising at least one movement of the head of the driver,
   determining at least one value of at least one predetermined parameter relating to each movement of the detected series, wherein the at least one measured parameter comprises an angle of rotation of the head of the driver with respect to the Earth's vertical or an angle of inclination of the head of the driver with respect to the Earth's horizontal,
   comparing the at least one value of each parameter with a predetermined interval of values of said parameter, each predetermined interval of values of said parameter being associated with a different type of head movement,
   identifying each movement of the detected series using the at least one comparison made,
   determining the speed and/or amplitude of each identified movement,
   detecting dynamic and static periods of the head of the driver and measuring the frequency and the duration of each detected period, and
   determining a level of vigilance of the driver using the speed and/or amplitude determined for each identified movement and the frequency and duration of each detected period,
   wherein the driver is detected to be in an alert state when at least one rotation of the head of the driver to the right or to the left with respect to the Earth's vertical is determined in a predefined time window without notable degradation of the movement characteristics.

2. The method as claimed in claim 1, wherein the at least one measured parameter comprises the amplitude of the rotation or of the inclination of the head of the driver and/or the speed of the rotation or of the inclination of the head of the driver and/or the duration of each movement and/or the frequency of each movement.

3. The method as claimed in claim 1, wherein the driver is detected to be in a drowsy state when the frequency of movement of the head of the driver with respect to the Earth's vertical or horizontal is below a predetermined dynamic threshold.

4. The method as claimed in claim 1, wherein the driver is detected to be in a drowsy state when at least one inclination of the head of the driver downward with respect to the Earth's horizontal with an acceleration that is characteristic of a free movement of the head for a duration shorter than 2 seconds is detected.

5. A method for determining a level of vigilance of a driver in a vehicle using a predetermined image-analyzing algorithm, said vehicle comprising a camera and a computer, said computer implementing said predetermined algorithm using at least one so-called "input" parameter relating to the attitude of the driver, the method comprising:
   generating, by the camera, a sequence of images of the head of the driver,
   executing the predetermined algorithm on said generated sequence of images in order to detect a series comprising at least one movement of the head of the driver,
   determining at least one value of at least one predetermined parameter relating to each movement of the detected series,
   comparing the at least one value of each parameter with a predetermined interval of values of said parameter, each predetermined interval of values of said parameter being associated with a different type of head movement,
   identifying each movement of the detected series using the at least one comparison made, determining the speed and/or amplitude of each identified movement, detecting dynamic and static periods of the head of the driver and measuring the frequency and the duration of each detected period, and determining a level of vigilance of the driver using the speed and/or amplitude determined for each identified movement and the frequency and duration of each detected period, wherein the driver is detected to be in an alert state when at least one rotation of the head of the driver to the right or to the left with respect to the Earth's vertical is determined in a predefined time window without notable degradation of the movement characteristics.

6. The method as claimed in claim 1, wherein the driver is detected to be in a distracted state when at least one rotation of the head of the driver to the right or to the left with respect to the Earth's vertical or downward with respect to the Earth's horizontal for a duration longer than a predetermined duration is determined.

7. A computer of a vehicle for determining a level of vigilance of a driver of said vehicle using a predetermined image-analyzing algorithm, said vehicle comprising a camera, said computer implementing said predetermined algorithm using at least one input parameter relating to the attitude of the driver and being configured to:

receive a sequence of images of the head of the driver, said sequence being generated by the camera, execute the predetermined algorithm on said received sequence of images in order to detect a series comprising at least one movement of the head of the driver, determine at least one value of at least one predetermined parameter relating to each movement of the detected series, wherein the at least one measured parameter comprises an angle of rotation of the head of the driver with respect to the Earth's vertical or an angle of inclination of the head of the driver with respect to the Earth's horizontal, compare the at least one value of each parameter with a predetermined interval of values of said parameter, each predetermined interval of values of said parameter being associated with a different type of head movement, identify each movement of the detected series using the at least one comparison made, determine the speed and/or amplitude of each identified movement, detect dynamic and static periods of the head of the driver and measure the frequency and duration of each detected period, and determining a level of vigilance of the driver using the speed and/or amplitude determined for each identified movement and the frequency and duration of each detected period, wherein the driver is detected to be in an alert state when at least one rotation of the head of the driver to the right or to the left with respect to the Earth's vertical is determined in a predefined time window without notable degradation of the movement characteristics.

8. A motor vehicle comprising a camera configured to generate a sequence of images of the head of the driver of said vehicle and a computer, as claimed in claim 7, connected to said camera in order to receive said sequence of images.

9. A motor vehicle comprising a camera configured to generate a sequence of images of the head of the driver of said vehicle and a computer, as claimed in claim 7, connected to said camera in order to receive said sequence of images.

* * * * *